United States Patent [19]

Verbiest et al.

[11] Patent Number: 4,852,084
[45] Date of Patent: Jul. 25, 1989

[54] INFORMATION TRANSMISSION SYSTEM

[75] Inventors: Willem J. A. Verbiest, Zwijndrecht; Marc M. L. Duponcheel, Wilrijk, both of Belgium

[73] Assignee: Alcatel N.V., Amsterdam, Netherlands

[21] Appl. No.: 144,410

[22] Filed: Jan. 15, 1988

[30] Foreign Application Priority Data

Jan. 16, 1987 [BE] Belgium .............................. 8700027

[51] Int. Cl.[4] ..................... H04Q 11/04; H04N 11/04
[52] U.S. Cl. ........................................ 370/60; 370/94; 358/13
[58] Field of Search ................ 358/13, 133, 134, 135; 370/60, 94, 85

[56] References Cited

U.S. PATENT DOCUMENTS

| 4,706,109 | 11/1987 | Murray | 358/13 |
|---|---|---|---|
| 4,716,453 | 12/1987 | Pawelski | 358/13 |
| 4,734,907 | 3/1988 | Turner | 370/94 |

FOREIGN PATENT DOCUMENTS

| 0230338 | 7/1987 | European Pat. Off. . |
|---|---|---|
| 0231967 | 8/1987 | European Pat. Off. . |
| PCT/EP87/-00792 | 12/1987 | PCT Int'l Appl. . |

OTHER PUBLICATIONS

J-Y Cochennec et al.; "Asynchronous Time Division Networks: Terminal Synchronization For Video And Sound Signals"; Globecom '85, IEEE Global Telecommunications Conference, New Orleans, Louisiana; Dec. 2-5, 1985; pp. 791-794.

W. D. Hofmann and D. E. Toxel; "Making Progressive Transmission Adaptive"; IEEE Transactions on Communications, vol. COM. 34, No. 8; Aug. 1986; pp. 806-813.

P. Gonet, J. P. Coudreuse; "Techniques Temporelles Asynchrones Et Reseaux Integres De Videocommunications"; Second International Conference On New Systems and Services in Telecommunication, Nov. 16-18, 1983, Liege, Belgium; pp. G6.1-G6.7.

Primary Examiner—Robert L. Griffin
Assistant Examiner—Wellington Chin
Attorney, Agent, or Firm—Christie, Parker & Hale

[57] ABSTRACT

Information signals (Y1, C1; Y2, C2: Y3, C3) relating to the same video image but each defining the image with a different accuracy are transmitted asynchronously and on a time division basis as packet sets (Y1, C1; Y21, C21; Y32, C32). In a receiving station (SS2) the information signals are derived from the received packet sets and by means of selection circuit (SEC1/3) two or more of these signals are supplied to a combination device (VTE) and are combined therein to form an image.

11 Claims, 2 Drawing Sheets

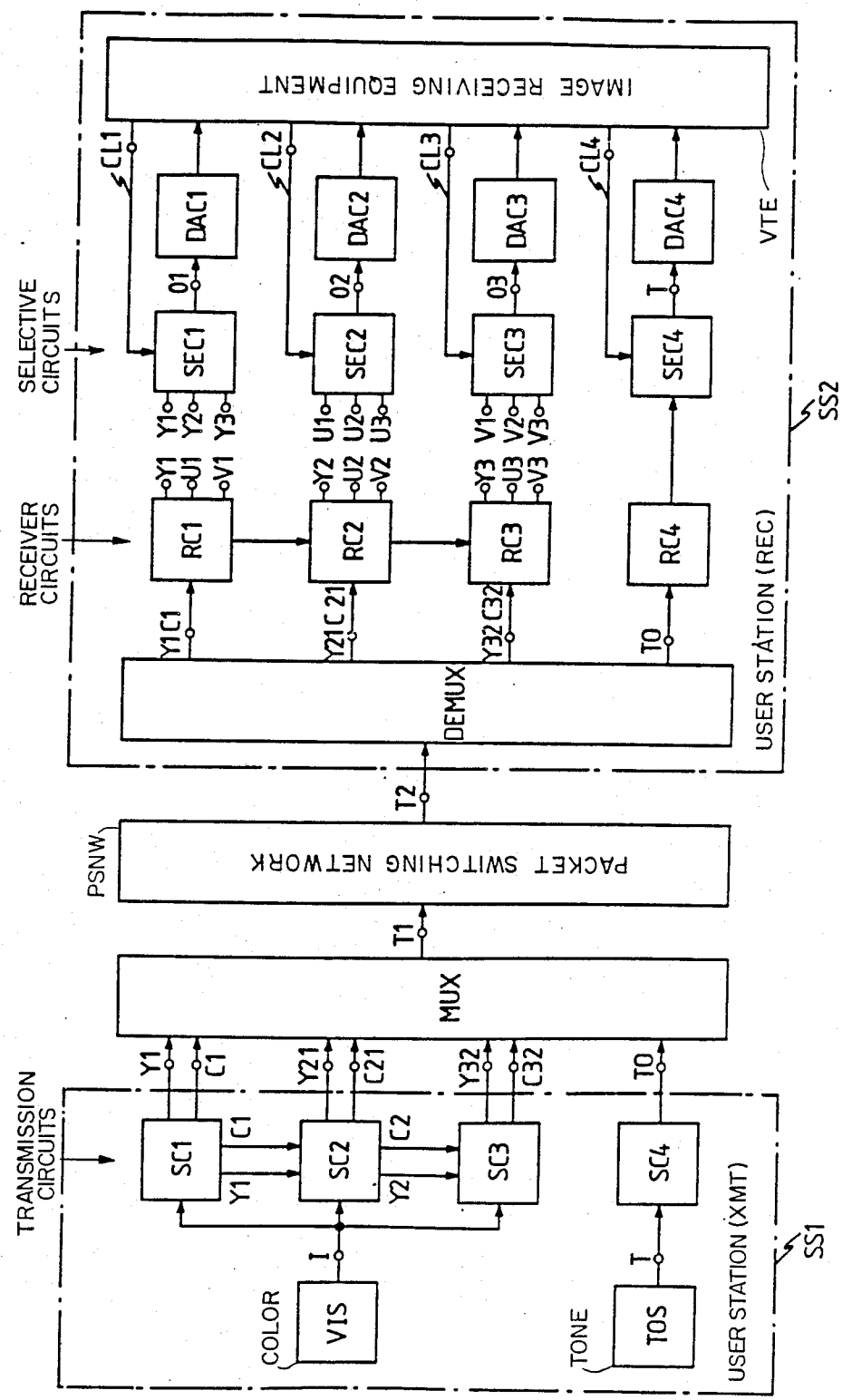

, 1

INFORMATION TRANSMISSION SYSTEM

TECHNICAL FIELD

The present invention relates to an information transmission system including a packet switching network.

BACKGROUND ART

An information transmission system including a packet switching network provided with terminals to which stations are coupled, at least one station being able to provide a plurality of information signals in the form of packets asynchronously and on a time division basis to its associated transmitting terminal, and at least one other station being able to process the packet sets received at its associated receiving terminal, is already known from the article "Asynchronous Time Division Networks: Terminal Synchronization for Video and Sound Signals, by J-Y Cochennec et al, Globecom '85, IEEE Global Telecommunications Conference, New Orleans, La. December 2-5, 1985, pp. 791-794".

In the system described in that article, in certain cases, e.g., real-time transmissions of video images, it is not possible to request the repetition of a lost packet and thus special measures have to be taken to compensate for the effect of such a loss. These measures for instance consist in replacing a line of a video image signal affected by the packet loss by the same line of a previous image.

The transmission of information signals one after the other which define versions of different accuracy of the same image and the combination of these successive signals in a receiving station are known per se from the article "Making Progressive Transmission Adaptive" by W. D. Hofmann and D. E. Toxel, published in IEEE Transactions on Communications, Vol. COM. 34, No. 8, August 1986, pp. 806-813.

DISCLOSURE OF INVENTION

An object of the present invention is to provide a packet-based asynchronous time-division multiplexed information transmission system wherein the loss of a packet is automatically compensated in the normal course of the system's operation, without requiring any special measures to be undertaken when such a loss has occurred.

This object is achieved in a presently preferred embodiment of the invention wherein information signals included in at least two sets of packets are derived in the originating station from the same information source and the destination station is able to combine the information signals of these packet sets.

In a preferred embodiment, the information source is a video image source and the information signals define different versions of the same video image, the two versions being combined into one single image in the receiving station. Because two separate sets of packets are received, the loss of a packet of one of these sets has substantially no influence on the image quality, so that no special measures have to be taken to maintain image quality.

Moreover, in the preferred embodiment, the information signals define versions of said image which each have a different accuracy. The information signals may thus be coded in an optimal way, for transmission substantially simultaneously asynchronously and in the form of packets, in accordance with the desired accuracy. This differs from the transmission of related sets of information signals and the combination of these signals in a receiving station known from the above-cited article by W. D. Hofmann and D. E. Toxel wherein the different sets are hierarchial and transmitted in sequence.

BRIEF DESCRIPTION OF DRAWINGS

The above mentioned and other objects and features of the invention will become more apparent and the invention itself will be best understood by referring to the following description of a presently preferred embodiment taken in conjunction with the accompanying drawing whose single FIGURE represents a block diagram of an information transmission system according to the invention.

BEST MODE FOR CARRYING OUT THE INVENTION

The presently preferred system shown in block diagram form in the drawing is an asynchronous time division transmission and includes a packet switching network PSNW which is provided with a plurality of terminals, such as T1 and T2, with which user stations such as SS1 and SS2 are coupled. This network PSNW is for instance of the type described in published Belgian patent application No. 2/61131 (M. De Prycker et al 2-2 —further filed as PCT/EP87/00792) and is built up by means of switching elements such as described in the above-referenced published Belgian Pat. No. 904100 (P. Debuysscher 3-5-1—corresponding to EP No. A1 0 231 967).

Each of the stations, such as SS1 and SS2, typically includes a transmission device and a receiving device, but in the drawing only the transmission device of station SS1 and the receiving device of station SS2 are shown.

The transmission device of station SS1 includes a video color image source VIS and an associated audio source TOS. This video color image source is for instance a video camera with which an image may be acquired and which then provides at its output I a like-referenced analog video color image signal I. The audio source TOS associated with the video camera provides at its output T a like-referenced audio signal T associated with the video color image. The output I of VIS is connected in parallel to transmission circuits SC1, SC2 and SC3 Which are of the type described in Belgian Pat. No. 904101 (W. Verbiest 1—corresponding to EP No. A2 0 230 338). A transmission circuit such as disclosed therein is able to first derive two coded information signals from the analog color image signal I provided by the source VIS, and to then transform these signals into two packet sets. The first information signal includes coded digital information concerning the mean luminance value of different blocks of the image, whilst the second information signal contains coded digital information concerning the mean chrominance value of these image blocks. More particularly, transmission circuits SC1, SC2 and SC3 produce simple luminance/-chrominance information signals Y1, C1; Y2, C2 and Y3, C3 (not shown).

In this connection, it should be noted that each luminance signal Y, i.e. Y1, Y2, Y3, is a linear combination of R (red), G (green) and B (blue) information signals and that each chrominance signal C, e.g. C1, C2, C3, is derived from the chrominance signals U, i.e. U1, U2, U3, and V, i.e. V1, V2, V3, which are given by the relations $$U = Y - R$$

$$V = Y - R$$

The transmission circuits differ from each other in that the luminance information signals Y1, Y2, Y3 as well as the chrominance information signals C1, C2, C3 relate to blocks of different dimensions of the image. Indeed:

the information signals Y1 and C1 relate to relatively larger image blocks, e.g. square blocks having an 8 mm side. They define the least accurate luminance and chrominance version of the image respectively;

the information signals Y2 and C2 relate to relatively smaller image blocks, e.g. square blocks having a 2 mm side. They define a more accurate luminance and chrominance version of the image respectively;

the information signals Y3 and C3 relate to the pixels of the image and define the most accurate luminance and chrominance version of the image respectively.

The information signals Y1, Y2, Y3 and C1, C2, C3 could be transmitted as such, but to limit the quantity of information to be transmitted, the information signals Y1 and C1 are transmitted, and:

instead of transmitting the main luminance signal Y2 of the smaller blocks the difference Y2−Y1 between this mean luminance signal Y2 and the mean luminance signal Y1 is transmitted. The same is true for the chrominance signal C2. In other words, in SC2 the information signals Y1 and C1 are used to form the information signals Y2−Y1 and C2−C1, as schematically indicated by the connections between SC1 and SC2. These signals are further transformed into respective packet sets Y21 and C21;

instead of transmitting the mean luminance signal Y3 of the pixels, a difference signal Y3−Y2 between this mean luminance signal Y3 and the mean luminance signal Y2 is transmitted. The same is true for the chrominance signal C3. In other words, in SC3 the information signals Y2 and C2 are used to form the information signals Y3−Y2 and C3−C2, as is indicated by the connections between transmission circuits SC2 and SC3. These signals are further transformed into respective packet sets Y32 and C32.

The output T of audio source TOS is connected to the transmission circuit SC4 wherein the analog audio signal T provided by the source TOS is transformed into a packet set TO containing coded digital information concerning this audio signal.

In connection with the above, it should be noted that the packet sets Y21, C21, and Y32, C23 may have a variable bit rate, whereas the packet sets Y1 and C1 have a constant bit rate so that synchronization bits may be inserted in the packets of these sets. Moreover, this constant bit rate is relatively low due to the relatively lower accuracy of the signals Y1 and C1. Also, as described in the above-referenced Belgian Pat. No. 904101 (W. Verbiest 1), in defining the information signals Y2, C2, Y3, C3 the information contained in previous images is taken into account, but this is not done for signals Y1 and C1 because in this way in the receiving station a first image build-up may be performed.

The packet sets Y1, C1; Y21, C21; Y32, C23 and TO are applied to the like named inputs of a multiplexer unit MUX which is of the type described in the article, "Techniques Temporelles Asynchrones et Réseaux Intègres de Vidéocommunications" published in the Second International Conference on New Systems and Services in Telecommunication, November 16–18, 1983, Liege, Belgium, pp G.6.1–G.6.7.

In this multiplexer unit the packets of the different packet sets are processed in an asynchronous way and on a time division multiplex basis and generated as a single packet stream at the output T1 of the unit. This output constitutes the output of the station SS1 and is connected to the associated terminal T1 of the packet switching network PSNW. As described in the above-referenced Belgian Pat. Nos. 904101 (W. Verbiest 1) and 904,100 (P. Debuysscher 3-5-1), the switching network transmits the packet stream to one or more of the user stations, for instance to the user station SS2 connected to terminal T2 of PNSW.

This station includes a demultiplexer unit DEMUX wherein the packet stream supplied to this terminal is split up in the packet streams Y1CI, Y21C21, Y32C32 and TO of this demultiplexer unit DEMUX. They are then respectively supplied to a plurality of receiver circuits RC1, RC2, RC3, and RC4, each for instance of the type described in the above-referenced Belgian Pat. No. 904101 (W. Verbiest 1). As described therein, such a receiver circuit is able to split up the luminance and chrominance packet stream which is applied to its input, in a digital luminance signal and two digital chrominance signals. More particularly, in receiver circuits RC1, RC2 and RC3 the respective input packet streams Y1C1; Y2C2 and Y32C32 are split up in the respective packet sets Y1, U1, V1; Y21, U21, V21 and Y32, U32, V23. The digital information signals included therein are further derived from these packet sets. For simplicity of notation, the same reference symbol is used herein for both the information signal and its corresponding packet set; juxtaposition of the reference numerals of two associated signals represents a difference signal: Y21=Y2−Y1; U21=U2−U1; V21=V2−V1; Y32=Y3−Y2; U23=U3−U2 and V32=V3−V2.

The information signals Y1, U1, V1 appear at the like named outputs of the transmitter circuit RCl, whereas in the receiver circuits RC2 and RC3 use is made of the connections with the circuits RC1 and RC2 to recover the original information signals Y2, U2, V2 and Y3, U3, V3 from the difference signals. More particularly:

in the receiver circuit RC2, signal Y21=Y2−Y1 is combined (Y21+Y1=Y2) with signal Y1 in such a manner that the digital luminance signal Y2 is generated on the like named output Y2. The same happens with signals U21 and U1 and with signals V21 and V1, the information signals U2 and V2 being generated on like named outputs of receiver circuit RC2;

in the receiver circuit RC3, signal Y32=Y3−Y2 is combined (Y32+Y2=Y3) with signal Y2 in such a way that the digital luminance signal Y3 is generated on the like named output Y3. The same happens with signals U32 and U2 and with signals V32 and V2, the information signals U32 and V23 appearing at like named outputs of RC3.

The above-mentioned luminance and chrominance signals Y1, Y2, Y3; U1, U2, U3 and V1, V2, V3 are supplied to like named inputs of respective selection circuits SEC1, SEC2, and SEC3 which are controlled from the image receiving equipment VTE, as schematically indicated by the connections CL1, CL2 and CL3 between equipment VTE and these selection circuits. By means of these connections, image receiving equipment VTE can control the selection circuits SEC1, SEC2 and SEC3 in such a manner that in equipment VTE a black/white image or a color image having one out of three accuracies is formed. More particularly:

by means of connection SEC1, one of the digital luminance signals Y1, Y2, Y3 defining different versions of a black/white image may be selected. This selected signal appears at the output O1;

by means of connections SEC1, SEC2 and SEC3, one of the groups of luminance and chrominance signals Y1, U1, V1; Y2, U2, V2; Y3, U3, V3 which define different versions of a color image may be selected. This selected group of signals then appears on the outputs O1, O2, O3.

The last mentioned outputs O1, O2, and O3 are connected to the receiving equipment VTE via the digital-to-analog converters DAC1, DAC2 and DAC3. In these converters the digital luminance and chrominance signals applied thereat are converted into analog signals and in VTE a black/white or color image is then formed by combining these signals.

The packet set TO which is generated at the output of the demultiplexer unit DEMUX is converted in receiver circuit RC4 to a digital audio signal T and this signal is supplied to a digital-to-analog converter DAC4 via a selection circuit SEC4 controller by the equipment VTE. The signal applied thereon is converted therein to an analog signal which is also supplied to the equipment VTE.

In connection with the above it should be noted that because in the station SS2 the information signals Y2 and Y3 are recovered by combining the information signals Y21 and Y32 with Y1 and Y2 respectively, the consequence of the loss of a packet in the corresponding packet set Y21 and Y32 is that at this moment the information signal Y1 or Y2 instead of Y21 or Y32 is present. In other words, the information of higher accuracy Y21 or Y23 is replaced by the information of lower accuracy Y1 or Y2 which is then available.

Hence, the loss of a packet of a packet set has substantially no influence on the quality of the black/white or color image which is realidzed in the station SS2 by means of the signals Y2, Y3; U2, U3; V2, V3. The same is not true for the black/white or color image which is realized by means of the information signals Y1, U1, V1; however, the probability of losing a packet in each of the packet sets Y1 and C1, and therefore of information in the signals Y1, U1, V1, is minimal because, as mentioned above, the bit rate of these sets is relatively low.

It should be noted that because the information signals Y1, U1, V1 are not built-up from information corresponding to previous images, a fast image build-up by means of these signals is assured, which is desirable for the user. The relatively inaccurate image thus obtained is afterwards improved by means of more accurate information.

The present invention has been described above with regard to the structure, function and use of a presently contemplated specific embodiment of the invention. It should be appreciated by those skilled in the art that many modifications and variations are possible. Accordingly, the exclusive rights afforded hereby should be broadly construed, limited only by the spirit and scope of the appended claims.

What is claimed is:

1. An information transmission system comprising:
a unitary original information source;
a packet switching network having a plurality of terminals;
a first station coupled to a first terminal of said network, said first station comprising:
receiving circuit means
for deriving each information signal of a plurality of information signals from said unitary information source such that at least one said each information signal is representative of the entire said unitary information source and
for assembling said plurality of information signals into a corresponding plurality of sets of packets, and
multiplexing means for supplying asynchronously and on a time division basis said corresponding plurality of sets of packets to said first terminal whereby all of said plurality of information signals derived from said unitary information source may be transmitted substantially simultaneously; and
a second station coupled to a second terminal of said network for receiving substantially simultaneously the said corresponding plurality of sets of packets derived from a single said unitary original information source and transmitted via said packet switching network from said first terminal, said second station comprising:
receiving means for processing the received said sets of packets into corresponding received information signals, and
combining means for combining the received information signals into a single reconstructed source of information corresponding to said unitary original source of information.

2. The information transmission system of claim 1, wherein:
said unitary original information source is a video image source,
said information signals define different versions of said video image, and
said different versions are combined by said receiving means into one single image.

3. An information transmission system comprising:
an original information source for providing an original video image;
a packet switching network having a plurality of terminals;
a first station coupled to a first terminal of said network, said first station comprising:
receiving circuit means for deriving from said original information source a plurality of information signals defining different versions of said original video image and for assembling said plurality of information signals into a corresponding plurality of sets of packets, and
multiplexing means for supplying asynchronously and on a time division basis said corresponding plurality of sets of packets to said first terminal; and
a second station coupled to a second terminal of said network for receiving said corresponding plurality of sets of packets via said packet switching network from said first terminal, said second station comprising:
receiving means for processing the received said sets of packets into corresponding received information signals, and
combining means for combining the received information signals correspnding to different version of said video image into a single reconstructed source of information corresponding to said original video image, wherein:

said information signals define said different versions of said video image with differing accuracies.

4. The information transmission system of claim 3, wherein:
said information signals respectively concern the mean luminance/chrominance value of corresponding different dimensions of blocks of said image.

5. The information transmission system of claim 3, wherein:
a first of said packet sets contains a first set of information signals defining a first version of lower accuracy, and
a second of said packet sets is derived from information signals derived from said first set of information signals and a second set of said information signals defining a second version of higher accuracy.

6. The information transmission system of claim 5 wherein:
said information signals respectively concern the mean luminance/chrominance value of corresponding different dimensions of blocks of said image and
said second packet sets contains information indicating the difference between the mean luminance/chrominance values of said versions of higher and lower accuracy.

7. The information transmission system of claim 5, wherein said first packet set has a constant bit rate.

8. The information transmission system of claim 7, wherein said first packet set includes synchronization signals.

9. The information transmission system of claim 1, wherein:
said first station generates more than two sets of packets which each contain information signals relating to a single said information source
said second station further comprises
selection means for selectively supplying the information signals to said combining means.

10. The information transmission system of claim 9, wherein
said information signals define said different versions of said image with differing accuracies said information signals respectively concern the mean luminance/chrominance value of corresponding different dimensions of blocks of said image,
said selection means selectively supplies said information signals to said combining means to form a black/white or color image with a predetermined accuracy.

11. Information transmission system according to claim 9, wherein one of said information signals is an audio signal.

* * * * *

UNITED STATES PATENT AND TRADEMARK OFFICE
CERTIFICATE OF CORRECTION

PATENT NO. : 4,852,084
DATED : July 25, 1989
INVENTOR(S) : W.J.A. Verbiest; M.M.L. Duponcheel It is certified that error appears in the above-identified patent and that said Letters Patent is hereby corrected as shown below:

On the Front Page:

Change "2 drawing sheets" to -- 1 drawing sheet --.

In the Specification:

Column 2, line 47, change "Which" to -- which --.
Column 3, line 5, change "R" to -- B --.
Column 4, line 68, change "equpiment" to -- equipment --.

In the Claims

Column 6, line 65, change "correspnding" to
-- corresponding --.

Signed and Sealed this

Eleventh Day of September, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,852,084
DATED : July 25, 1989
INVENTOR(S) : W.J.A. Verbiest; M.M.L. Duponcheel It is certified that error appears in the above-identified patent and that said Letters Patent is hereby corrected as shown below:

On the Front Page:

Abstract, line 1, after "C2" change the colon to a semicolon.

Column 5, line 38, delete "of a packet" (second occurrence).
Column 5, line 40, change "realidzed" to -- realized --.

Signed and Sealed this

Seventh Day of January, 1992

Attest:

HARRY F. MANBECK, JR.

*Attesting Officer*     *Commissioner of Patents and Trademarks*